Patented Sept. 13, 1932

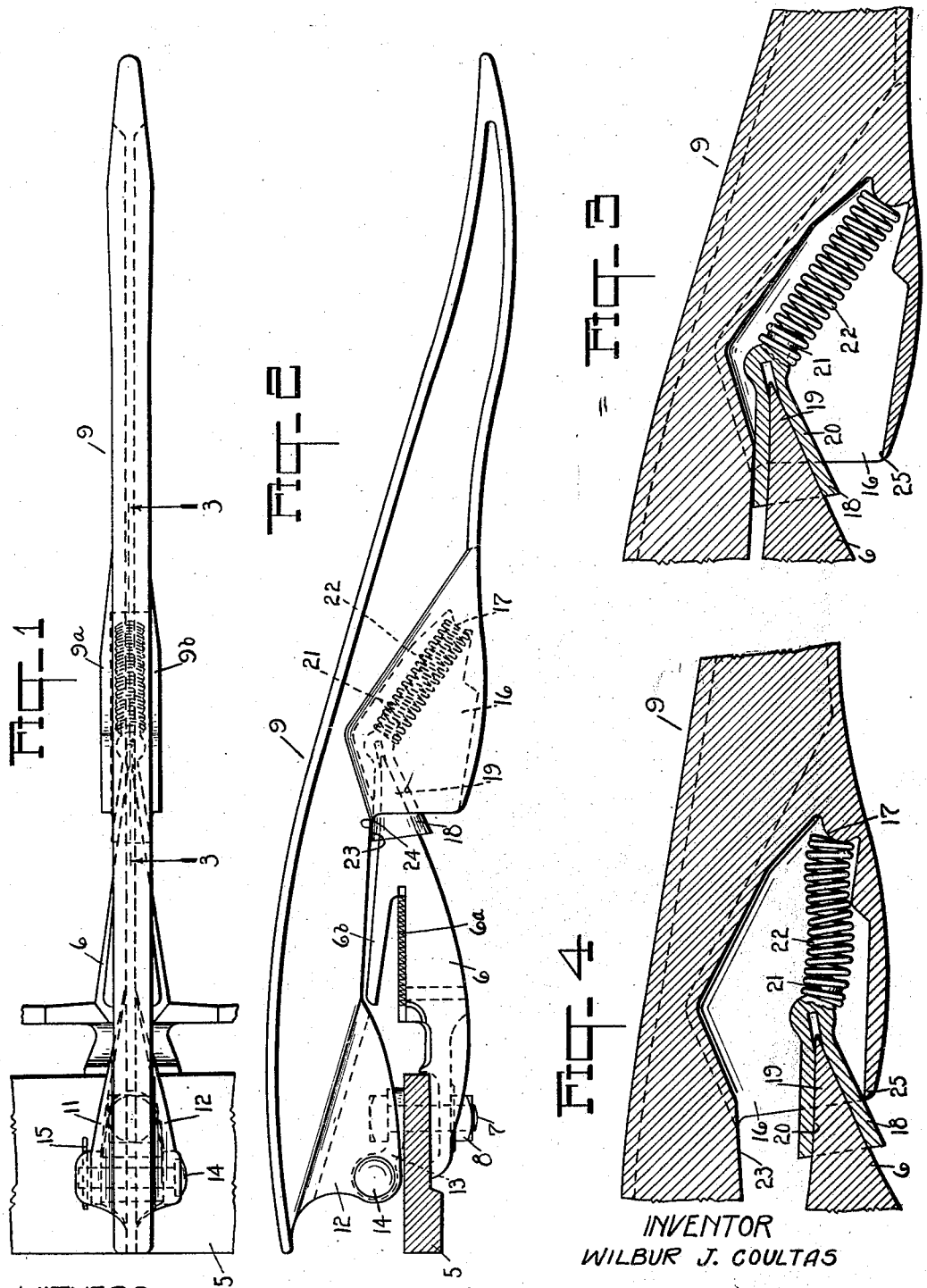

1,877,272

UNITED STATES PATENT OFFICE

WILBUR J. COULTAS, OF ROCK ISLAND, ILLINOIS, ASSIGNOR TO DEERE & COMPANY, OF MOLINE, ILLINOIS, A CORPORATION OF ILLINOIS

MOWER

Application filed September 27, 1929. Serial No. 395,511.

This invention relates to mowers of the type used for cutting hay, peas, beans, and the like. In the ordinary mowers now in use, if any part of the hay or other crop being mowed is in a lodged condition, that is to say, is in a depression or adjacent to a slight rise in the surface of the ground, the regular guard fingers are apt to pass over the hay so lodged without getting under it and bringing it up into position to be cut by the knife of the mower. Also, in the cutting of peas and beans and other plants lying close to the ground the ordinary guard fingers frequently pass over the vines or do not raise the same high enough to prevent the pods being cut by the knife. My present invention has for its principal object to provide a new and improved device in the form of a lifting guard for machines of this type so that the lodged hay, or the peas, beans, etc., will be properly raised for cutting by the knife of the mower. These lifting guards also serve the additional purpose of forward guide extensions so that the regular guard fingers will be guided up and over any obstructions that may be encountered.

Another object of my present invention is to provide a lifting guard which may be quickly and easily attached to each regular guard finger of a mower.

A further object of the invention is to provide such a guard with spring means so that it will be normally held in its lowermost position but will be capable of yielding upwardly in passing over uneven ground or striking an obstruction.

A still further object of the invention is to provide a lifting guard which is adapted to be attached to the regular guard fingers of various mowers, regardless of the lengths of such guard fingers, without the necessity of having to make any special adjustment to adapt it for such attachment.

I accomplish my several objects as illustrated in the accompanying drawing and hereinafter described. What I regard as new is set forth in the claims.

In the drawing,—

Fig. 1 is a top view of my improved lifting guard in position on one of the regular guard fingers of a mower;

Fig. 2 is a side view thereof;

Fig. 3 is a cross-sectional view taken on the line 3—3 of Fig. 1, and illustrating my improved guard in its lowermost position; and Fig. 4 is a view similar to Fig. 3 illustrating said guard in its most elevated position.

Referring to the drawing,—5 indicates the usual finger bar of a mower, and 6 one of the regular guard fingers, a plurality of which are secured to the finger bar. Each guard finger 6 is secured to the forward portion of the finger bar by means of a bolt 7 and nut 8, said guard finger extending forwardly from said finger bar in the usual manner, as shown in Fig. 2. The ledger plate, with which each of these guard fingers is usually provided, is indicated at 6a, and it will be understood that the usual sickle bar and blades are disposed between these ledger plates and the upper extensions 6b of the guard fingers, as is well known by those skilled in the art. My improved lifting guard is indicated as a whole by the reference numeral 9, and is preferably formed as a cast unit although it may be formed in other ways than by casting. This lifting guard is pivotally connected at its rear end to the finger bar 5, and to this end I provide said lifting guard with a pair of depending side webs 11, 12, one being located adjacent each side thereof. A suitable bracket 13 is secured to the upper portion of the finger bar 5 by means of the bolt 7 which secures the guard finger 6 to said finger bar, as shown in Fig. 2. The depending side webs 11 and 12 are positioned one at each side of the upper portion of the bracket 13 and are pivotally connected to said bracket by means of a pivot bolt 14, which is held in position by a cotter pin 15, as shown in Fig. 1. It will thus be seen that by the parts described the lifting guard 9 is pivotally mounted on the finger bar, and extends forwardly therefrom.

The forward portion of the lifting guard is pointed and has a relatively flat bottom curve so as to keep the point close to the ground. The construction of the guard is reenforced by top and bottom ribs or flanges, between which extends a web portion as shown in Figs. 1 and 2.

About midway of the length of the lifting guard the sides thereof are bulged outwardly as indicated by 9a, 9b, and formed in this bulged out portion is a suitable cavity 16, which extends longitudinally of said guard and is open at its rear end as shown. At the forward end portion of the bottom of said cavity 16 is provided a small cylindrical nub or projection 17 for a purpose hereinafter described.

A tapered cap 18 is adapted to fit over the cone-shaped forward end 19 of the guard finger 6, the forward end of which extends into the cavity 16, and to this end said cap is provided with a cone-shaped bore 20, best shown in Figs. 3 and 4. On the forward end of the cap 18 is provided a small lug or projection 21 over which the rear end of a coiled spring 22 is adapted to fit, and the forward end of said spring is adapted to bear against the nub or projection 17 previously described.

Said spring 22 is always under compression, and such compression of the spring tends to keep the lifting guard 9 in its lowermost position either with the surface 23 of said guard and the upper surface 24 of the cap 18 in contact as shown in Figs. 2 and 3, or with the forward portion of the guard bearing down against the ground, so that the lifting guard moves along the ground surface in such position when the machine is traveling over comparatively level ground.

When the forward end of the lifting guard 9, however, meets with a rising slope in the surface of the ground, or with an obstruction, such forward end will be forced upward against the action of the spring 22 and will thus follow the contour of the ground. When the peak of the rising slope has been reached the forward end of the lifting guard will again be forced down by the action of the spring 22. The upward movement of the forward end of the lifting guard 9, however, is limited by the lower side of the cap 18 contacting with the ledge 25 at the lower rear edge of the cavity 16. The relation between the stop surfaces 23 and 25 and the spring 22 is such that no matter what position the lifting guard assumes in the range of movement defined by these stop surfaces the spring 22 will always tend to force the guard down to its lowest position.

As above mentioned, my improved guard will fit over regular guard fingers of varying lengths without the need of any special adjustment. As will be readily apparent from the drawing, if the regular guard finger 6 is somewhat longer than that shown, the spring 22 is merely compressed to a greater amount between the lug 21 and the nub 17, and if the regular guard finger is shorter, the compression of said spring will be normally somewhat less.

By providing the cap 18 with the cone-shaped recess 20 which fits over the cone-shaped forward end of the guard finger 6, a separate wearing surface is provided which in the operation of the machine contacts with the upper surface 23 and with the lower edge 25 above mentioned, thus sustaining any wear resulting from contact with these stop surfaces and preventing the wearing down of the forward end 19 of the guard finger 6.

The inner vertical edges of the side wings 9a and 9b lie in close proximity to the side surfaces of the conical cap 18 (Fig. 1) so that if any excessive side thrust should be exerted on the guard it can be resisted by the cap 18.

As the forward end of the lifting guard 9 is normally in a position lower than the regular guard finger 6, such forward end will work into depressions in the ground and lift the hay or other crop up from such depressions so that the same may be cut by the knife of the mower. It will be understood that the present lifting guard is adapted for use on mowers in the cutting of hay, alfalfa, or any other crop as desired, and in this connection attention is called to the fact that in using these lifting guards in the cutting of peas and beans the flexibility of the guards enables them to follow uneven ground and also to extend considerably below the points of the regular guard fingers to which they are attached, whereby they will raise the vines over the knife so that the possibility of cutting the pods is largely overcome.

It is to be understood that I do not wish to be limited to the specific construction shown and described herein, except as the same may come within the scope of the appended claims, as various modifications of such construction will occur to those skilled in the art.

I claim:

1. A lifting guard for the guard finger of a mower, comprising a member having a cavity formed therein intermediate its ends for receiving the forward end of said guard finger, a spring in said cavity for cooperating with said guard finger, and means at the rear end of said member for pivotally connecting the same to the mower.

2. A lifting guard for the guard finger of a mower, comprising a member having a cavity formed therein for receiving the forward end of said guard finger, means at the rear end of said member for pivotally connecting the same to a mower, and yielding means cooperating with said guard finger and so disposed within said cavity as to normally force said member downwardly.

3. A lifting guard for the guard finger of a mower, comprising a member having a cavity formed therein intermediate its ends and open at the rear for receiving the forward end of said guard finger and provided with depending webs at its rear end portion for connecting the same to the mower, a projection formed in the forward end of said cavity, and a spring engaging over said projection and cooperating with said guard finger for exerting downward pressure on said lifting guard.

4. A lifting guard for the guard finger of a mower, comprising a member having a cavity formed therein intermediate its ends and open at the rear for receiving the forward end of said guard finger, a projection formed in the forward end of said cavity, a coiled spring engaging over said projection and cooperating with said guard finger for yieldingly connecting said lifting guard with said guard finger, depending webs on said member and spaced from said cavity, and means pivotally connected with said webs for supporting said lifting guard on the mower.

5. The combination with a mower comprising a finger bar and a guard finger mounted thereon, of a lifting guard movably mounted to extend forwardly of said guard finger, and yielding means interposed between the forward end of said guard finger and said lifting guard to hold the latter in its operative position.

6. The combination with a mower comprising a finger bar and a guard finger mounted thereon, of a lifting guard pivotally mounted at its rear end on said finger bar, and yielding means interposed between said guard finger and said lifting guard to hold the latter in its operative position.

7. The combination with a mower comprising a finger bar and a guard finger mounted thereon, of a lifting guard pivotally mounted at its rear end on said finger bar and provided with a cavity in its under side, and yielding means mounted in said cavity and cooperating with the forward end of said guard finger to hold said lifting guard in its operative position.

8. The combination with a mower comprising a finger bar and a guard finger mounted thereon, of a lifting guard having depending webs at its rear end portion, means for pivotally connecting said webs to said finger bar, and spring means mounted in said lifting guard for yieldingly connecting the same with said guard finger.

9. The combination with a mower comprising a finger bar and a guard finger mounted thereon, of a lifting guard pivotally mounted at its rear end on said finger bar and having a cavity therein, said cavity extending longitudinally thereof and open at its rear end for the reception of the forward end of said guard finger, and means mounted in said cavity and cooperating with said guard finger for yieldingly holding the forward end of said lifting guard down in operative position.

10. The combination with a mower comprising a finger bar and a guard finger mounted thereon, of a lifting guard having its rear end pivotally mounted on said finger bar, and yielding means mounted in said lifting guard forward of its pivot mounting and reacting directly against said guard finger for normally holding the forward end of said lifting guard in its operative position.

11. The combination with a mower comprising a finger bar and a guard finger mounted thereon, of a lifting guard pivotally mounted on said finger bar and extending forwardly therefrom, said lifting guard having a longitudinally extending cavity formed therein and open at its rear end, a spring mounted at one end in said cavity, and a cap mounted on the forward end of said guard finger, said spring bearing against said cap.

12. The combination with a mower comprising a finger bar and a guard finger mounted thereon, of a lifting guard pivotally mounted on said finger bar and extending forwardly therefrom, said lifting guard having a longitudinally extending cavity formed therein open at its rear end, a cap mounted on the forward end of said guard finger, and a spring interposed between said cap and the forward end of said cavity for yieldingly connecting said guard finger with said lifting guard.

13. The combination with a mower comprising a finger bar and a guard finger mounted thereon, of a lifting guard pivotally mounted on said finger bar and extending forwardly therefrom, said lifting guard having a longitudinally extending cavity formed therein open at its rear end, a cap mounted on the forward end of said guard finger, and a spring interposed between said cap and the forward end of said cavity for yieldingly connecting said guard finger with said lifting guard, the upper and lower walls of said cavity coacting with said guard finger to form stop means for preventing downward and upward movement of said lifting guard beyond predetermined points.

14. The combination with a mower comprising a finger bar and a guard finger mounted thereon, of a lifting guard pivotally mounted on said finger bar and extending forwardly therefrom, said lifting guard having a cavity formed therein open at its rear end, and a cap mounted on the forward end of said guard finger, said cap providing a wearing surface between said guard finger and the upper and lower walls of said cavity in the pivotal movement of said lifting guard relative to said guard finger.

15. The combination of a lifting guard, means mounting the lifting guard on a cutting apparatus having a guard finger, a cap mounted on the guard finger, and yielding means interposed between said cap and said lifting guard.

16. The combination of a lifting guard, means pivotally mounting the lifting guard on a cutting apparatus having a guard finger, a cap mounted on the guard finger, and yielding means interposed between said cap and said lifting guard.

17. The combination of a lifting guard, means pivotally mounting the lifting guard on a cutting apparatus having a guard finger, said lifting guard having a cavity formed therein, a cap mounted on said guard finger and extending into said cavity, and yielding means interposed between said cap and said lifting guard.

In witness whereof I have hereunto set my hand this 23rd day of September, A. D. 1929.

WILBUR J. COULTAS.

CERTIFICATE OF CORRECTION.

Patent No. 1,877,272. September 13, 1932.

WILBUR J. COULTAS.

It is hereby certified that the residence of the applicant in the above numbered patent was erroneously described and specified as "Rock Island, Illinois", whereas said residence should have been described and specified as Moline, Illinois, as shown by the record of the case in this office; and that the said Letters Patent should be read with this correction therein that the same may conform to the record of the case in the Patent Office.

Signed and sealed this 29th day of November, A. D. 1932.

(Seal)

M. J. Moore,
Acting Commissioner of Patents.